United States Patent
Dietz

[19]

[11] Patent Number: 5,771,844

[45] Date of Patent: Jun. 30, 1998

[54] CYCLONE SEPARATOR HAVING INCREASED GAS FLOW CAPACITY

[75] Inventor: David H. Dietz, Hampton, N.J.

[73] Assignee: Foster Wheeler Development Corp., Clinton, N.J.

[21] Appl. No.: 628,004

[22] Filed: Apr. 4, 1996

[51] Int. Cl.[6] .......................... B01D 51/02; B01D 45/12; B04C 5/08

[52] U.S. Cl. ........................... 122/4 D; 110/216; 55/269; 55/459.1

[58] Field of Search .................................. 110/216, 245; 122/4 D, 6 A; 55/269, 459.1

[56] References Cited

U.S. PATENT DOCUMENTS

| | | |
|---|---|---|
| 2,838,382 | 6/1958 | Ringgenberg . |
| 3,802,570 | 4/1974 | Dehne ..................................... 55/459.1 |
| 5,190,650 | 3/1993 | Tammera . |
| 5,203,284 | 4/1993 | Dietz ...................................... 122/4 D |
| 5,275,641 | 1/1994 | Tammera et al. ...................... 55/459.5 |
| 5,391,211 | 2/1995 | Alliston . |
| 5,393,315 | 2/1995 | Alliston et al. .......................... 110/216 |

*Primary Examiner*—Henry A. Bennett
*Assistant Examiner*—Gregory A. Wilson
*Attorney, Agent, or Firm*—Martin Smolowitz

[57] ABSTRACT

A cyclone separator adapted for attachment to the upper outlet end of a fluidized bed reactor such as an atmospheric (ACFB) or pressurized fluidized bed combustor (PFBC) has its gas flow capacity increased while maintaining high inlet gas flow velocity and particle separation efficiency. The cyclone inlet flow passageway has aspect ratio h/w increased to at least 4/1 and preferably to the range of 5/1 to 10/1. Also, the inlet passage inner wall is tapered or curved so that the inlet opening area exceeds that of the outlet opening adjacent the cyclone barrel. The cyclone outlet vortex tube lower portion has a truncated cone shape attached to a cylindrical-shaped vortex tube upper portion. The cyclone separator can be formed from multiple parallel tubes each having longitudinal fins for carrying a cooling fluid such as water or steam, and having a refractory material covering the tubes and fins.

12 Claims, 3 Drawing Sheets

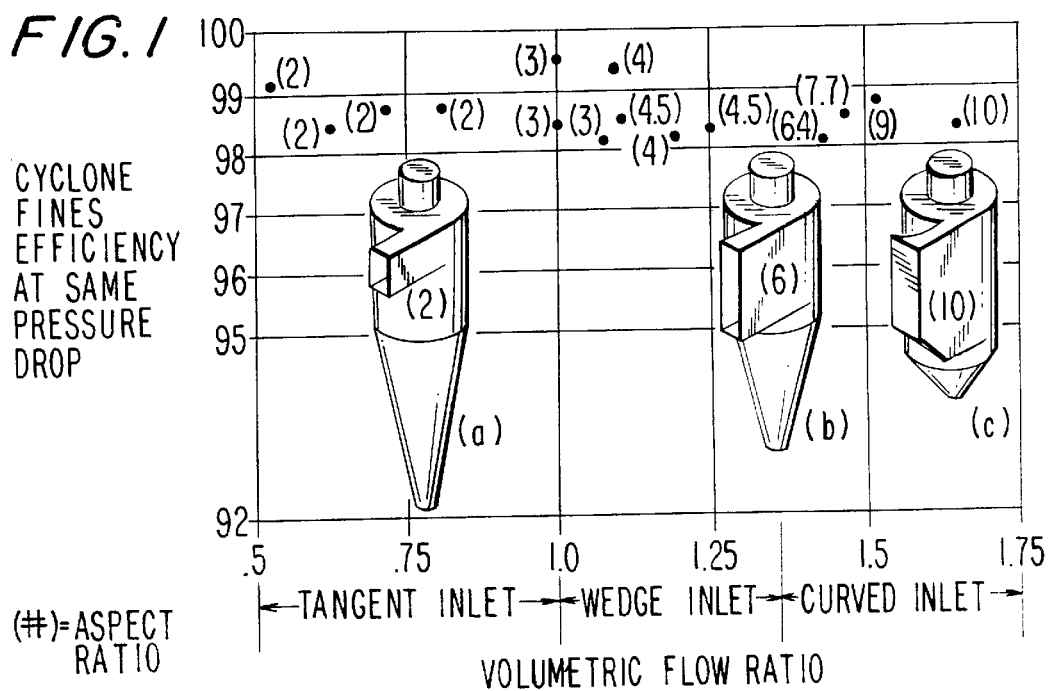
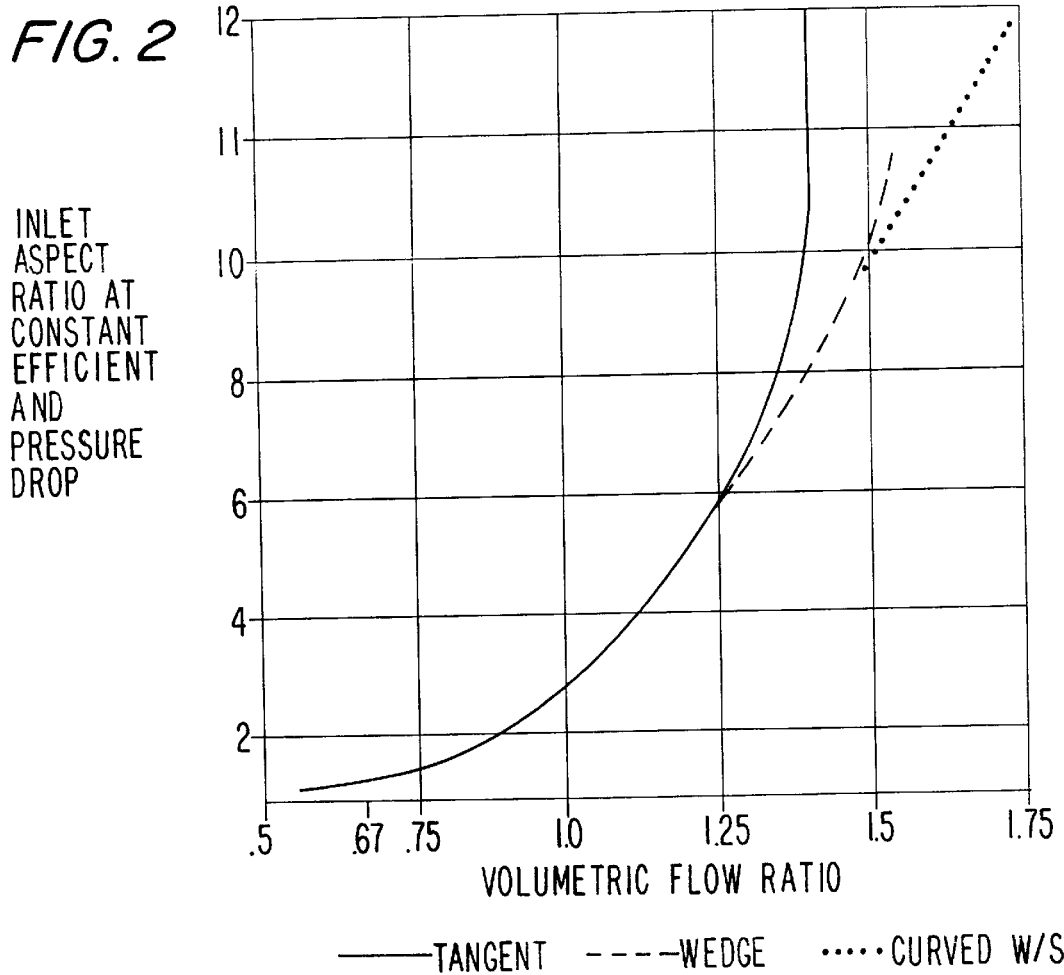

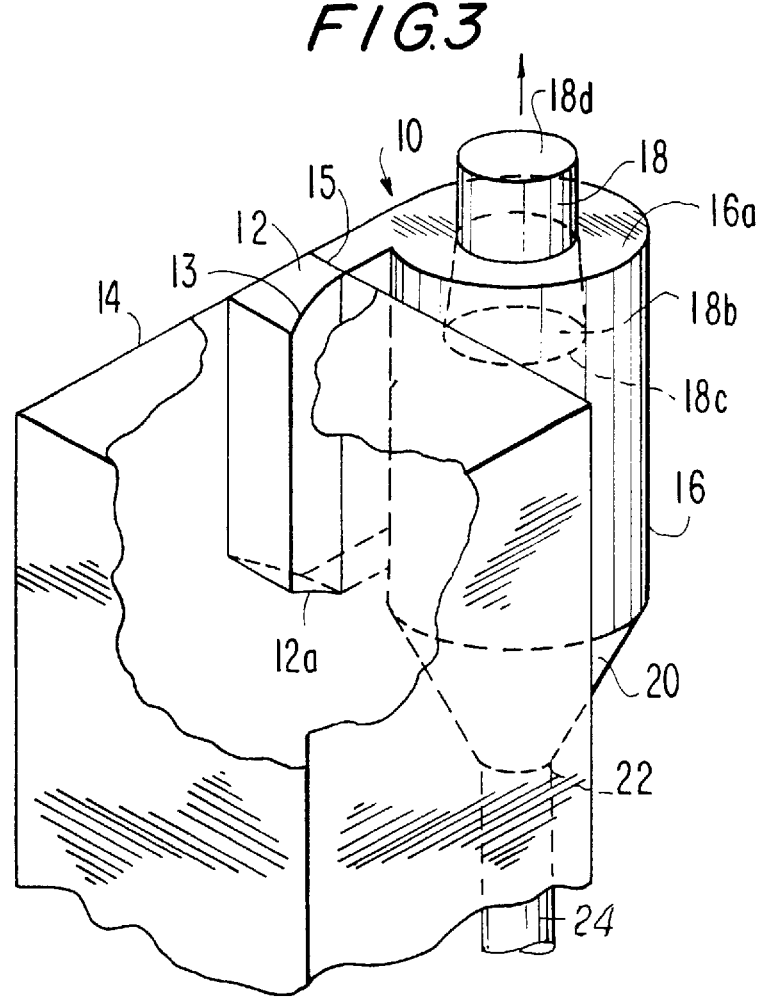

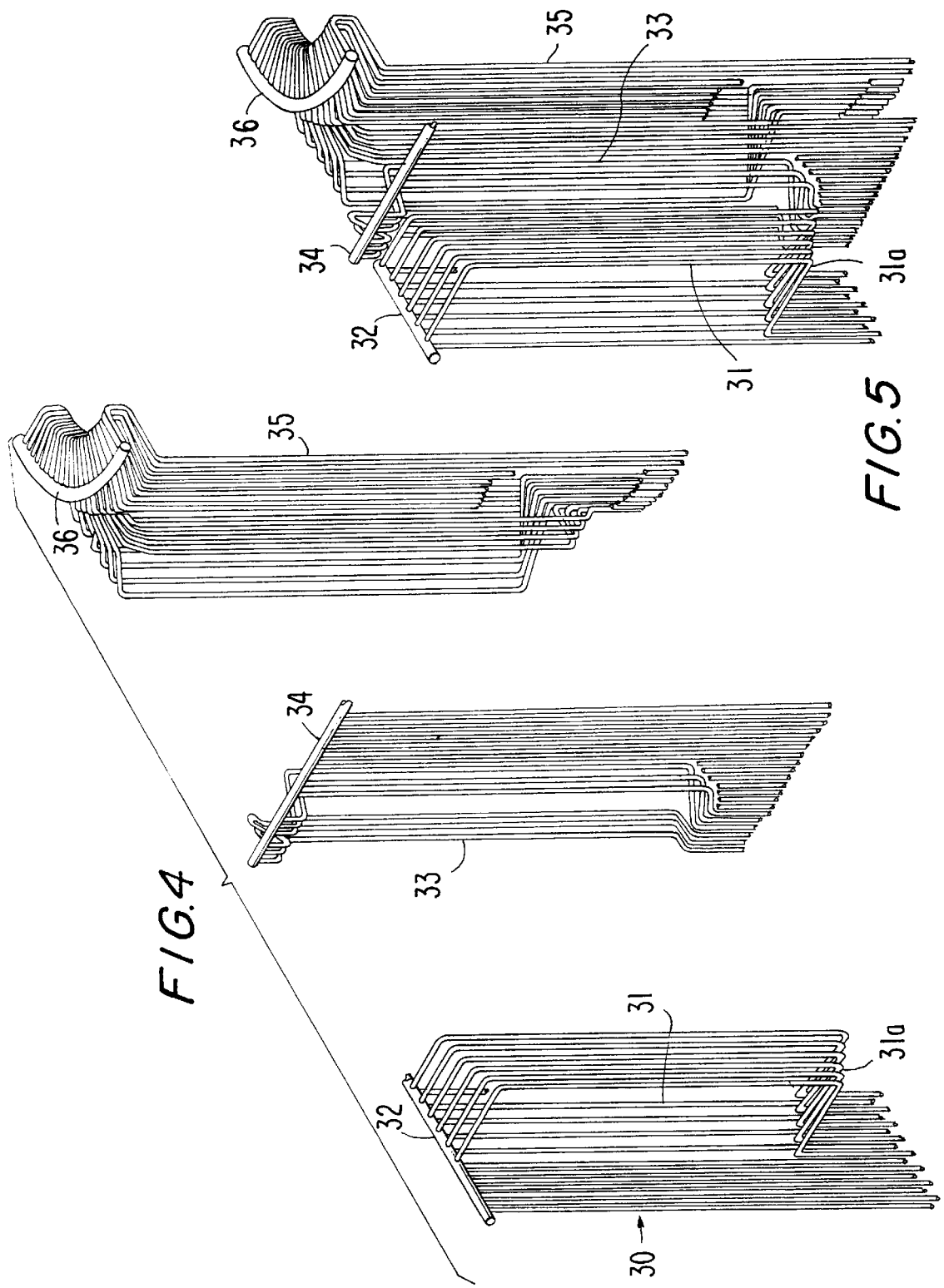

CYCLONE SEPARATOR HAVING INCREASED GAS FLOW CAPACITY

BACKGROUND OF INVENTION:

This invention pertains to cyclone separators such as used with circulating fluidized bed combustors and reactors. It pertains particularly to such cyclone separators having increased gas flow capacity provided by an increased aspect ratio inlet passage and a conical shaped outlet vortex tube.

Cyclone separators connected to the outlet of circulating fluidized bed combustors (CFBC) are generally known, such as disclosed by U.S. Pat. No. 5,203,284 to Dietz. Such cyclones are desirably operated at their peak inlet gas velocity to achieve maximum particle separation efficiency. Operating at an inlet velocity higher than the peak flow value results in a decrease in particle separation efficiency, because of particle re-entrainment caused by some gas flow exiting the cyclone through the outlet tube. Operating at an inlet gas velocity below the peak value results in lower cyclone separation efficiency, because of the lower centrifugal separating forces generated inside the cyclone. For atmospheric circulating fluidized bed (ACFB) combustor installations, the cyclone inlet gas flow velocity is usually lower than the peak value because the operating gas velocity is established by a refractory material erosion limit, which is about 90 ft./sec. gas velocity. Large ACFB cyclones, i.e. greater than about 21 ft. diameter, have peak inlet gas flow velocity of about 150 ft./sec. Hence, such a large diameter CFB cyclone operating at only 90 ft./sec. velocity is not operating at the maximum gas throughput capacity by a ratio of 90/150 ratio, or at only 60% of the maximum gas throughput before causing re-entrainment of the particles being separated. Thus, because of gas flow pressure drop economics and cyclone refractory life problems due to erosion, another method instead of raising a CFBC cyclone gas inlet velocity needs to be found in order to achieve maximum gas flow capacity and the lowest cost design for CFBC cyclone separators.

Conventional cyclone separators have inlet passage widths that are ¼ to ⅓ the cyclone barrel diameter (D), and the inlet flow passage height ranges between 0.5D to 0.75D, so that the conventional cyclone separator inlet passage aspect ratio of height (h) to width (w) usually ranges between 2/1 to 3/1. The conventional cyclone gas outlet vortex tube has a diameter range of 0.3D to 0.5D, with 0.4D being a typical value. Cyclones having an inlet aspect ratio of 2 provide more efficient particle separation than for an inlet aspect ratio of 3, but the cyclone pressure drop is slightly higher for the more efficient design, and the gas flow rate or throughput of the higher efficiency cyclone (aspect ratio 2) is about ⅔ of that for the more conventional aspect ratio 3 cyclone inlet. For the purpose of this invention, cyclone gas flow capacity is defined as gas flow for a particular cyclone separator design divided by the gas flow of a conventional cyclone design having inlet aspect ratio of 3. Therefore, the gas flow capacity ratio of the conventional aspect ratio 3 cyclone is 1. This normalization of the cyclone gas flow capacity is based on the fact that conventional cyclones for CFB combustors have an inlet passage aspect ratio of 3. Because the conventional cyclone separator inlet gas flow velocity is limited by both erosion and pressure drop considerations, an improved configuration is required to achieve increased cyclone separator gas flow capacity under these limiting conditions.

SUMMARY OF INVENTION

This invention provides an improved cyclone separator design configuration which is useful with circulating fluidized bed (CFB) combustors and reactors, and achieves up to about 67% increase in cyclone gas flow capacity without increasing the pressure drop or decreasing the cyclone particle separation efficiency. For the cyclone separator of this invention, both the inlet flow passage and outlet vortex tube flow path areas and shapes are changed. Specifically, the cyclone separator configuration has increased flow area for the inlet passage and outlet vortex tube, and also has narrower inlet passage width to avoid flow interference with the larger diameter outlet vortex tube. The inlet passage height is increased in a greater proportion than the change in passage width, so as to provide an increased inlet passage aspect ratio and achieve a larger flow area for increased gas flow capacity. The cyclone inlet flow passageway has an aspect ratio of height (h) to width (w) at least 4/1, and is preferably in the range of 5/1 to 12/1. The cyclone outlet vortex tube extending above the cyclone main body or barrel portion includes a lower truncated cone shaped portion located within the barrel portion, and has an upper cylindrical shaped portion having exit flow area less than the truncated cone inlet opening area. The cyclone separator also includes a conical-shaped lower hopper portion centrally attached to the main body lower end, and has a central bottom opening and conduit for solids removal from the cyclone separator.

This invention advantageously provides an improved cyclone separator design configuration which achieves increased cyclone gas flow capacity results from having greater aspect ratios for the cyclone inlet passageway and having the truncated conical shaped configuration for the lower portion of the gas outlet vortex tube. Although this improved cyclone separator configuration has been described as useful at the outlet of a fluidized bed combustion furnace, the separator can also be applied with various chemical reactors requiring a particle collecting device such as for fluidized catalytical convertors (FCC), calciners, and other such gas-solids separation systems.

BRIEF DESCRIPTION OF DRAWINGS

FIG. 1 is a pictorial chart showing three cyclone separators having particle separation efficiency at constant pressure drop for the various cyclone inlet flow passage configurations versus volumetric gas flow capacity ratio with respect to a cyclone having inlet aspect ratio of 3, with the number shown in parenthesis adjacent each data point being the respective inlet flow passage aspect ratio for the cyclone. The volumetic gas flow capacity ratio is normalized.

FIG. 2 is a graph of cyclone inlet aspect ratio at constant pressure drop and particle separation efficiency vs. volumetric gas flow ratio for various cyclone inlet flow passage configurations.

FIG. 3 shows a perspective view of a cyclone separator configuration according to the invention having the separator inlet flow passageway attached onto the upper portion of a fluidized bed combustion furnace;

FIG. 4 shows an expanded perspective view of a cyclone separator inlet passageway formed of multiple parallel tubes for a fluidized bed combustion furnace; and FIG. 5 is a perspective view of a portion of a cyclone separator formed from multiple tubes which can be finned longitudinally and covered with a refractory material.

DESCRIPTION OF INVENTION

The FIG. 1 pictorial chart generally shows an isometric sketch of a conventional cyclone separator design (a) used downstream from fluidized bed combustion furnaces, as compared with the new cyclone separator designs (b) and (c) which have increased inlet passage aspect ratios of height (h) to width (w) of at least 4/1, and volumetric flow capacity ratio exceeding 1.0. The various data points, which are based on field testing of specific cyclone separator designs, confirm the new configuration for increasing CFBC cyclone gas capacity by providing increased aspect ratios for the inlet passage exceeding 4/1, according to the invention. Three different cyclone separator inlet and outlet configurations are used as generally shown in FIG. 1 below the data points with all three designs shown having the same inlet gas flow velocity and the same pressure drop. The designs from left to right range from the conventional cyclone separator design (a) to the modified cyclone design (b) and the new design (c) shown on the right.

The FIG. 2 graph shows the advantages and uniqueness of the new cyclone separator design configurations (b) and (c) by plotting the cyclone inlet aspect ratio (h/w) versus volumetric gas flow capacity for the different cyclone inlet passageway designs. The solid curve is for a conventional cyclone separator (a) having the conventional tangent inlet with an aspect ratio h/w not exceeding 3/1, and for which the volumetric gas flow capacity ratio is limited to about 1.35. The dashed curve for a cyclone separator having inlet passage aspect ratio h/w of 4–5 extends the volumetic gas flow capacity ratio to about 1.5 for cyclone separators having wedge shaped inlet passage and straight walls. The dotted curve is for cyclone separator having inlet passage aspect ratios h/w of 5–12 and which further extends the cyclone volumetric gas flow capacity to 1.5–1.75 for constant pressure drop and separation efficiency.

In order to maintain constant pressure drop at these higher gas flows for the new design cyclone separator, the outlet vortex tube lower portion has a truncated cone or skirt shape as shown by FIG. 3. For cyclone separators having barrel diameter D, this truncated cone has an inlet diameter larger than 0.5D, and an outlet vortex tube diameter equal to or smaller than 0.5D, located at the top of the cyclone separator.

FIG. 3 generally shows a perspective view of the cyclone separator configuration and its attachment directly onto the outlet of a fluidized bed combustion furnace. The cyclone separator 10 includes a rectangular-shaped inlet flow passageway 12 which usually extends partially into the upper portion of a fluidized bed combustion (FBC) furnace 14. The cyclone inlet flow passageway 12 is connected tangentially onto a cylindrical-shaped body or barrel portion 16 of the cyclone separator 10. The inlet passageway 12 has an aspect ratio of height (h) to width (w) at least 4/1, and preferably is in the range of 5/1–12/1. The inner wall 13 of the inlet passageway 12 can be straight so as to form a wedge-shaped passage having a larger cross-sectional flow area at its inlet end, or wall 13 can preferably have the inner wall curved inwardly as shown.

The cyclone separator 10 includes a centrally-located outlet vortex tube 18 which extends upwardly from the upper end 16a of the cyclone barrel portion 16. The upper outlet portion 18a of the vortex tube 18 is cylindrical-shaped, and the lower inlet portion 18b of the vortex tube 18 has a truncated cone shape. The vortex tube lower portion 18b extends downwardly into the cyclone barrel portion 16 by a dimension of 0.5–0.6D. Thus, the vortex tube lower inlet opening at 18c has a diameter and cross-sectional area which exceeds that of the tube upper outlet opening 18d. Relative to the cyclone barrel diameter D, the vortex tube lower truncated cone 18b has an inlet diameter of 0.5–0.6D, and the vortex tube upper outlet portion 18a has a diameter of 0.4D–0.5D.

The cyclone separator 10 also includes a conical-shaped hopper 20 attached pressure-tightly to the lower end of barrel portion 16. The hopper 20 has a lower exit opening 22 and attached cond wt 24, for withdrawal of particulate solids from the cyclone separator.

The new CFB cyclone separator design of this invention provides advantages and uniqueness in several areas: The cyclone inlet flow passage 12 preferably has an inside curved wall 13 which is shaped to cause the entrained particulate solids to move outwardly towards the tangent wall prior to entering the cyclone barrel 16. The inlet gas flow accelerates toward the barrel wall away from the outlet vortex tube skirt portion 18b as the particulate solids enter the cyclone barrel 16. For this new design cyclone separator, a 67% increase in gas flow for the same pressure drop and separation efficiency is achieved as compared to conventional CFB cyclones. The new cyclone separator design inlet passage aspect ratio of h/w adjacent the barrel of about 10/1 is significantly greater than the conventional aspect ratio range of 2-3/1. A combustion furnace gas exit area can have a conventional 3:1 aspect ratio, but the attached cyclone separator entrance passage can have an increased unconventional cyclone separator aspect ratio up to 10:1. Thus, the aspect ratio of the inlet flow passage can have any value from about 10:1 at the cyclone barrel to a lower ratio conforming to more conventional cyclone inlet aspect ratios.

Because the cyclone separator outlet vortex tube lower portion shape is a truncated cone or skirt 18b, the gas flow enters at a larger diameter and cross-section area than exists for the vortex tube upper portion 18a exit area. The vortex tube skirt 18b shape avoids solids moving near the vortex tube from being re-entrained by the gas flow leaving the cyclone up through the vortex tube 18. The trailing edge of the curved inlet passage 12 is tangent like the tangent inlet passage of the high efficiency cyclone design. The gas flow or throughput capacity having a tangent inlet with a taller-narrower inlet passages is about 67% more than that for a conventional cyclone. The entrained solids flow forms a continuous sheet along the cyclone barrel 16, thus avoiding a region of high erosion associated with cyclones having smaller inlet passage aspect ratios. The cyclone inlet curved inner wall 13 aids in solids separation and reduces the inlet cyclone pressure drop by streamlining the gas flow from the fluidized bed combustion furnace 14. The lower side 12a of inlet passage 12 is preferably sloped downwardly so that the aspect ratio h/w gradually increases and the cross-sectional area decreases so as to accelerate the gas flow and avoid solids build-up in the bottom portion of the inlet passage 12 and cause higher cyclone pressure drop. The inlet passage 12 having greater aspect ratios of at least 4/1, causes the entrained solids to flow in a sheet-like pattern along the barrel portion 16 inner wall and flow more evenly to the lower drain opening 22 provided at the bottom of the lower exit conical shaped hopper 20. The downward inlet passage flow direction directs the solids flow path toward the cyclone lower cone or hopper 20, and thereby improves the cyclone separation efficiency. The drain opening 22 preferably has a cross-sectional flow area smaller than that of the upper outlet vortex tube portion 18a. If desired, a conduit 24 can be attached to the opening 22 to convey or recycle the particulate solids back to the combustor or reactor 14.

The attachment of the cyclone separator 10 to the outlet opening in a rear wall 15 of fluidized bed combustion furnace 14 is also unique. Both the cyclone separator 10 and the furnace 14, are preferably fabricated from multiple adjacent pressurizable metal tubes as shown by FIGS. 4 and 5. The cyclone separator 30 includes the multiple metal tubes 31 connected to header 32 for carrying pressurized water or steam for cooling the cyclone separator and furnace walls. The furnace tubes 31 are used to form the cyclone inlet passage as generally shown in an expanded view by FIG. 4. Every other tube 31 for furnace side wall panel is bent outwardly at 31a to form the curved inlet passage within the furnace 14. The furnace rear wall tubes 33 connected to header 34 are also bent so as to form the connection with the cyclone separator barrel portion tubes 35. The cyclone barrel entrance is formed by bending the barrel tubes 35 connected to curved header 36 so as to form the increased inlet passageway aspect ratio of at least 4/1 and up to 12/1 at the cyclone barrel entrance. The tubes bent from the furnace rear wall 15 are connected to tubes bent from the cyclone barrel 16 to form the attachment of the cyclone separator to the furnace. All tubes which are bent out of plane return to the same plane above the cyclone inlet flow passageway and connect to a header used by adjacent tubes. These bends form the inlet flow passage for the gas from the CFB furnace to the cyclone separator barrel portion 16.

The tubes 31, 33 and 35 all have longitudinal metal fins welded to the tubes and extending between them. The tubes and fins are being covered with a suitable refractory material (not shown) to limit or avoid erosion of the tubes by the high velocity flowing particles and also to minimize undesired heat losses from the cyclone separator. The tubes are all connected to either the furnace wall top headers or to the cyclone top headers. No additional furnace headers are required because this tube arrangement does not introduce more boiler piping circuitry to the furnace and cyclone separator configuration.

This invention will be further described by an example, which should not be construed as limiting the scope of the invention.

EXAMPLE

An improved cyclone separator is constructed suitable for attachment onto the outlet passage of a circulating fluidized bed combustor (CFBC). The cyclone separator is constructed of multiple adjacent metal tubes each having longitudinal fins and covered with a suitable refractory material, and has the following construction features and characteristics:

| | |
|---|---|
| Cyclone barrel diameter, ft. | 23 |
| Cyclone barrel length, ft. | 43 |
| Inlet passage height, ft. | 40 |
| Inlet passage width, ft. | 4 |
| Inlet passage aspect ratio | 10 |
| Vortex outlet tube inlet diameter, ft. | 14 |
| Vortex tube extension into cyclone barrel, ft. | 12 |
| Vortex tube outlet diameter, ft. | 12 |
| Truncated cone length, ft. | 12 |
| Tubes outside diameter, in. | 3 |
| Tubes spacing, in. | 6 |

Although this invention has been described broadly and also in terms of a preferred embodiment, it will be understood that modifications and variations can be made within the scope of the invention which is defined by the following claims.

I claim:

1. A cyclone separator adapted for attachment to an outlet of a fluidized bed combustor or reactor for particle collection from a gas stream containing entrained solid particles, said cyclone separator comprising:

a cylindrical-shaped central body portion having a rectangular-shaped inlet passage connected tangentialy to the body portion, said inlet passage having a height (h) to width (w) aspect ratio of at least 4/1;

a cylindrical-shaped upper outlet vortex tube centrally connected to the central body portion at its upper end; said outlet vortex tube having a lower truncated cone shaped portion extending downwardly into said central body portion with an inlet cross-sectional flow area exceeding its outlet cross-sectional flow area; and a conical-shaped lower outlet hopper portion centrally connected to the central body portion at its lower end, said hopper portion having a bottom opening for particulate solids withdrawal.

2. The cyclone separator of claim 1, wherein said rectangular-shaped inlet passage has a tapered wedge shape having larger cross-sectional flow area at its inlet end.

3. The cyclone separator of claim 1, wherein said rectangular-shaped inlet passage has an inner wall (13) which is curved to provide a larger cross-sectional flow area at its the passage inlet end than that adjacent the cyclone body portion.

4. The cyclone separator of claim 1, wherein said rectangular-shaped inlet passage has a lower side which is sloped downwardly so that the aspect ratio h/w increases and the passage cross-sectional area decreases toward said central body portion.

5. The cyclone separator of claim 1, wherein said outlet vortex tube lower truncated cone-shape portion has an inlet diameter of 0.5–0.6D relative to diameter D of said central body portion.

6. The cyclone separator of claim 1, wherein said outlet vortex tube lower truncated cone portion extends downwardly into said central body portion by a dimension of 0.5–0.6D relative to the diameter D of said central body portion.

7. The cyclone separator of claim 1, wherein said inlet passageway is attached to the outlet opening of a fluidized bed combustion furnace and is located flush with the rear wall of the furnace.

8. The cyclone separator of claim 1, wherein said inlet passageway extends into the outlet wall of a fluidized bed combustion furnace.

9. The cyclone separator of claim 7, wherein the cyclone separator and combustion furnace are fabricated from multiple adjacent pressurizable tubes each having elongated longitudinal fins welded onto the tubes, said tubes and fins being covered with a refractory material.

10. A cyclone separator device adapted for attachment to an outlet of a fluidized bed combustor furnace, said cyclone comprising:

a cylindrical-shaped central body portion having a rectangular-shaped inlet flow passage connected tangentially to the body portion, said inlet passage having a height (h) to width (w) aspect ratio of at least 4/1;

said rectangular-shaped inlet passage having an inner wall which is curved to provided smaller cross-sectional flow area adjacent to said cyclone body portion and having said inlet passage lower side sloped downwardly toward said central body portion;

a cylindrical-shaped upper outlet vortex tube centrally connected to the body portion at its upper end; said vortex tube having a lower truncated cone shaped portion having a lower inlet diameter larger than its upper outlet diameter; and a conical shaped lower outlet hopper portion centrally connected to the body portion at its lower end, said hopper part having a bottom opening smaller than said upper outlet vortex tube opening.

11. The cyclone separator of claim 1, wherein said rectangular-shaped inlet passageway has a height (h) to width (w) aspect ratio in the range of 5/1 to 12/1.

12. The cyclone separator of claim 1, wherein said lower outlet hopper portion bottom opening has a cross-sectional area smaller than that of said upper outlet vortex tube opening.

* * * * *